United States Patent
Jones et al.

(10) Patent No.: US 7,827,796 B2
(45) Date of Patent: Nov. 9, 2010

(54) ROTARY METERING VALVE ARRANGEMENT

(75) Inventors: Robert Paul Jones, Birmingham (GB); Daniel James Bickley, Solihull (GB)

(73) Assignee: Goodrich Control Systems Limited (GB)

( * ) Notice: Subject to any disclaimer, the term of this patent is extended or adjusted under 35 U.S.C. 154(b) by 569 days.

(21) Appl. No.: 11/853,858

(22) Filed: Sep. 12, 2007

(65) Prior Publication Data

US 2008/0067463 A1 Mar. 20, 2008

(30) Foreign Application Priority Data

Sep. 19, 2006 (GB) .................... 0618356.0

(51) Int. Cl.
G05D 7/06 (2006.01)

(52) U.S. Cl. .................... 60/734; 251/208; 251/286

(58) Field of Classification Search ............... 251/208, 251/207, 209, 286, 287, 288; 60/39.281, 60/734
See application file for complete search history.

(56) References Cited

U.S. PATENT DOCUMENTS

| 2,290,783 | A | * | 7/1942 | Turpin | ............... 137/242 |
|---|---|---|---|---|---|
| 3,892,259 | A | * | 7/1975 | McClocklin | ........... 137/625.21 |
| 3,915,188 | A | | 10/1975 | Burnell et al. | |
| 4,205,822 | A | * | 6/1980 | Bernat | .................. 251/208 |
| 4,633,904 | A | * | 1/1987 | Schumann et al. | ...... 137/625.15 |
| 4,825,908 | A | * | 5/1989 | Tsuchihashi et al. | ... 137/625.43 |
| 5,042,529 | A | * | 8/1991 | Yeh | .................. 137/625.31 |
| 2005/0016176 | A1 | * | 1/2005 | Griffiths et al. | ............... 60/734 |

* cited by examiner

*Primary Examiner*—John Bastianelli
(74) *Attorney, Agent, or Firm*—Andrus, Sceales, Starke & Sawall, LLP

(57) ABSTRACT

A rotary metering valve arrangement comprises a rotary metering valve arranged to control the supply of fuel to a Pressure Raising and Shut-Off Valve (PRSOV), the metering valve comprising a valve plate provided with first and second latching ports and an angularly movable valve element provided with a recess registrable, in use, with the first and second latching ports to control communication therebetween, the PRSOV comprising a valve member slidable within a bore provided with third and fourth latching ports the valve member being provided with a recess registrable, in use, with the third and fourth latching ports to control communication therebetween, the second and third latching ports communicating with one another.

7 Claims, 3 Drawing Sheets

ROTARY METERING VALVE ARRANGEMENT

This invention relates to a metering valve arrangement for use in controlling the supply of fuel to an engine. In particular, the invention relates to a rotary metering valve arrangement.

A rotary metering valve is disclosed in U.S. Pat. No. 3,915,188 which comprises a valve plate in which a metering orifice is provided. A valve element is angularly movable under the control of, for example, a suitable motor between a position in which the metering orifice is closed by the valve element and an open position. The valve element, in order to have a low co-efficient of friction and a good abrasion resistance, is typically manufactured from a bearing material such as Rulon.

With some designs of fuel system, for example those designed for use with turbo-prop engines, it is desirable that in the event of an electrical power failure to the engine and associated control system the turbo-prop continues to operate at the speed at which it was operating immediately prior to the failure by holding the fuel metering valve against movement and using a back-up hydromechanical governor. The use of a rotary metering valve in such applications has the advantage that in the event of a power failure, the metering valve is held against movement, for example by the brake arrangement associated with the motor normally used to move the valve element thereof.

It is further desirable to provide a hydraulic latching capability into the fuel system so that, upon operation of a fuel shut-off arrangement to terminate fuel supply to an engine, the system can be latched in its shut-down state without the need for an electrically/magnetically actuated latching device. This enables system electrical power to be removed after shut-down without causing the system to restart. This arrangement provides a low cost and reliable solution to incorporating a latching capability into a fuel system. It is also desirable in a fuel control system to provide a latching capability that when activated in the shut-down condition is predominantly independent of the subsequent operation/state of the metering valve. For instance if the position of the metering valve inadvertently changes after shut-down due to failure of its electrically activated drive this should not affect the latched fuel shut-off condition of the system In a rotary metering valve, the hydraulic and frictional forces applied, in use, to the valve plate and valve element thereof are complex and these components have to be carefully designed to avoid the valve element 'sticking' to the valve plate. The provision of a hydraulic latching capability using, for example, a porting arrangement provided in the valve plate and/or valve element may increase the risk of such 'sticking' as this will change the balance of the hydraulically applied forces experienced by the valve elements. If there is a risk of such 'sticking' occurring, then it may be necessary to provide a larger motor than may otherwise be necessary to ensure that the valve element can always be driven to its desired position. The provision of a larger motor has cost and weight penalties.

Instead of providing a larger motor, the risk of 'sticking' can be mitigated by reducing the hydraulic and frictional forces applied to the valve element, which can be achieved by reducing the surface area of the valve element.

It is appreciated that the design of the aforementioned latching port arrangement is key to enabling a reduction in the surface area of the valve element. However, if this porting arrangement is too close to the centre of rotation of the valve element, the angular movement of the valve element could have to increase to provide the required hydraulic latching capability. This would result in an increase in the size of the Rotational Variable Differential Transformer (RVDT), used to monitor the angular position of the valve, again incurring unacceptable cost and weight penalties.

Furthermore, if the latching port arrangement encroaches on the metering orifice of the rotary metering valve, there would be a detrimental affect on the performance of the fuel system.

Hence it is an objective of the present invention to provide hydraulic latching capability in a rotary metering valve, without incurring unacceptable cost and weight penalties, and without affecting the performance of the rotary metering valve and the fuel system.

According to the present invention there is provided a rotary metering valve arrangement comprising a rotary metering valve arranged to control the supply of fuel to a Pressure Raising and Shut-Off Valve (PRSOV), the metering valve comprising a valve plate provided with first and second latching ports and an angularly movable valve element provided with a recess registrable, in use, with the first and second latching ports to control communication therebetween, the PRSOV comprising a valve member slidable within a bore provided with third and fourth latching ports, the valve member being provided with a recess registrable, in use, with the third and fourth latching ports to control communication therebetween, the second and third latching ports communicating with one another.

In use, such an arrangement can be operated such that, in the event of the PRSOV moving to a shut-off position, on operation of a control valve, for example in the form of a Non-Latching Solenoid controlled Shut-Off Valve (NLSSOV), communication is established between the first and fourth latching ports, via the second and third latching ports. This latches the PRSOV in its shut-off position and effectively by-passes the operation of the control valve. This ensures that even if the NLSSOV is allowed to return to a 'fuel-on' position, for example by interrupting the power supply thereof, the PRSOV remains in its shut-off position until such time as it is re-set.

The first port conveniently communicates with a control chamber of a Pressure Drop Spill Valve (PDSV).

In order to reduce the effect of the provision of the first and second latching ports on the risk of the valve element sticking to the valve plate, at least one of the first and second latching ports is conveniently located at a small radial distance from an axis of angular movement of the valve element. The other of the first and second latching ports is conveniently defined by a series of openings in fluid communication with one another and positioned at different angular locations, and at different distances from the axis of angular movement of the valve element.

The invention will further be described, by way of example, with reference to the accompanying drawings, in which.

Figure 1:
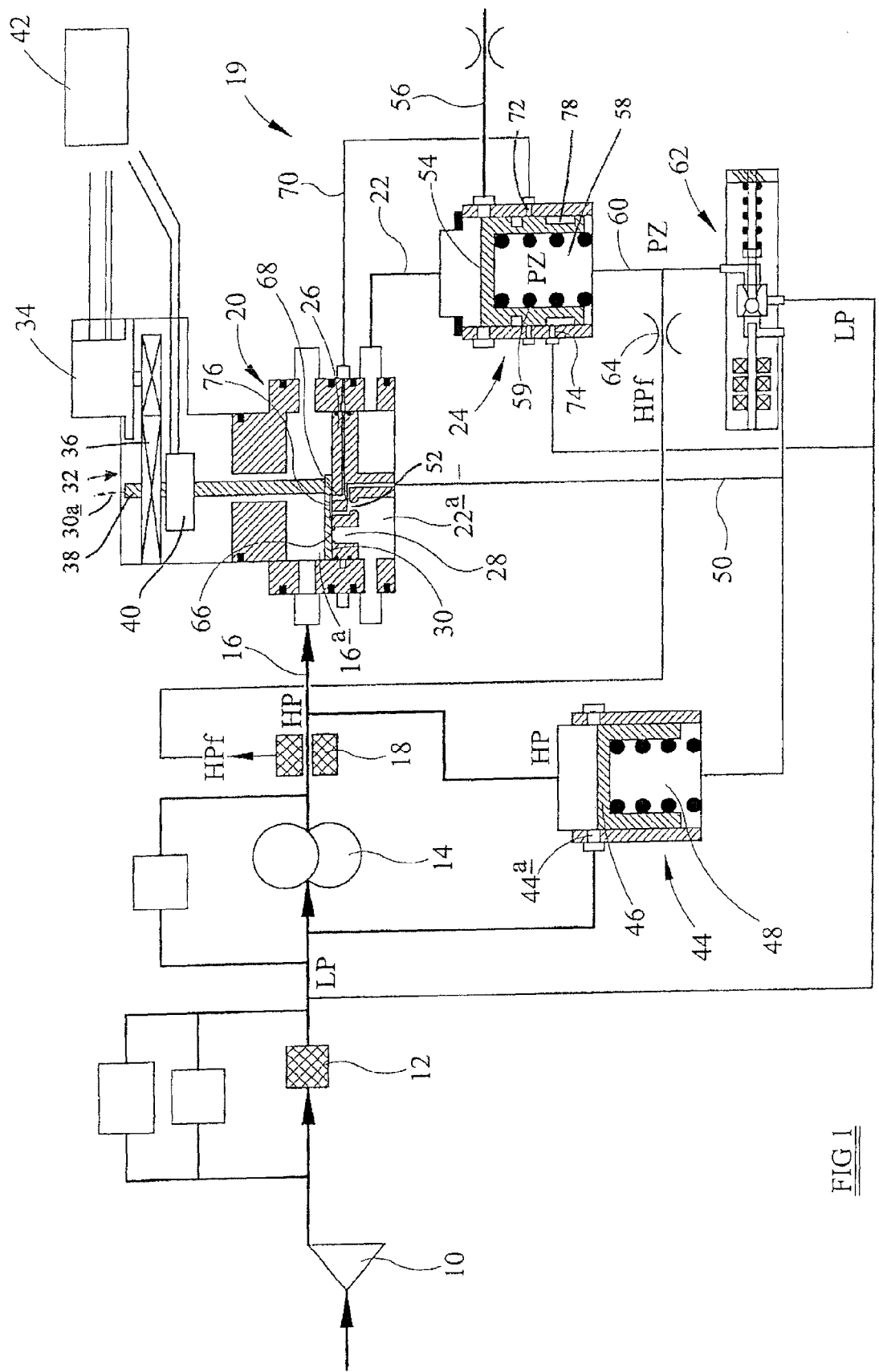
FIG. 1 is a diagram illustrating a fuel system incorporating a rotary metering valve arrangement in accordance with an embodiment of the invention.

Referring firstly to FIG. 1 there is illustrated, diagrammatically, a fuel system for use in the delivery of fuel to a turbo-prop gas turbine engine. The fuel system comprises a low pressure pump 10 arranged to supply fuel from a reservoir through a filter 12 to the inlet side of a high pressure fuel pump 14. The fuel pump 14 delivers fuel to a supply line 16 in which is provided a flow washed filter 18. A rotary metering valve arrangement 19 includes a rotary metering valve 20 which has an inlet connected to the supply line 16 and an outlet from which fuel is delivered through a delivery line 22 to a Pressure Raising and Shut-Off Valve (PRSOV) 24.

The rotary metering valve 20 comprises a housing in which is located a valve plate 26 having a metering orifice 28 formed therein. A valve element 30 abuts a surface of the valve plate 26 and is angularly movable about an axis 30a by a drive arrangement 32 to vary the degree by which the valve element 30 obscures the metering orifice 28. When the valve element 30 covers the majority of the metering orifice 28, then fuel is only able to flow through the metering valve 20 from a chamber 16a thereof communicating with the supply line 16 to a chamber 22a thereof communicating with the delivery line 22 at a low rate. Movement of the valve element 30 under the control of the drive arrangement 32 to increase the area of the metering orifice 28 available for fuel to flow through increases the rate of fuel supply to the PRSOV 24.

The drive arrangement 32 conveniently comprises a stepper motor 34 and gear arrangement 36 operable to drive a drive shaft 38 connected to the valve element 30. A Rotary Variable Differential Transformer (RVDT) 40 monitors the angular position of the shaft 38, and hence the position of the valve element 30, and provides a rotational position signal to a Propulsion Control and Monitoring Unit (PCMU) 42 which is used to control the operation of the stepper motor 34.

A Pressure Drop Spill Valve (PDSV) 44 is provided and comprises a spring biased valve element 46 movable within a bore. One surface of the valve element 46 is exposed to fuel at high pressure from the supply line 16. An opposing surface of the valve element 46 defines, in part, a control chamber 48 which communicates through a line 50 with the chamber 22a of the metering valve 20 located downstream of the metering orifice 28. It will be appreciated that the position occupied by the valve element 46 is dependent upon the pressure difference between the supply line 16 and the line 50. In the event that the pressure difference exceeds a predetermined level, then the valve element 46 will be moved to a position in which a spill port 44a of the PDSV 44 is opened, thereby allowing fuel to be spilt through the PDSV 44 to the low pressure side of the pump 14. It will be appreciated from FIG. 1 that the line 50 communicates with chamber 22a through a pull down orifice 52 formed in the valve plate 26.

The PRSOV 24 comprises a valve element 54 slidable within a bore and movable to control the degree by which an outlet port is obscured. When the valve element 54 occupies an open position, as illustrated, then fuel from the delivery line 22 is delivered through the PRSOV 24 through an outlet line 56 to the burners of the engine. When the valve element 54 occupies a position in which the outlet port is closed, the supply of fuel to the engine is terminated. The position occupied by the valve element 54 is dependent upon the fluid pressure within a control chamber 58 of the PRSOV 24. In normal operation, when there is fuel flow to the engine, the control chamber 58 communicates through a line 60 and Non-Latching Solenoid Shut-Off Valve (NLSSOV) 62 with the low pressure side of the pump 14. The line 60 further communicates through a restrictor 64 with a fuel line connected to the filter 18. It will be appreciated that, in normal operation, the restrictor 64 and valve 62 together form a fluid potentiometer network arrangement, and thus that the control chamber 58 is held at an intermediate pressure.

The NLSSOV 62, in addition to controlling communication between the control chamber 58 and low pressure, further controls communication between the line 50, and hence the control chamber 48 of the PDSV 44, and the low pressure side of the pump 14. In normal operation, when there is fuel flow to the engine, the valve 62 is held in a position in which communication between the line 50 and low pressure side of the pump 14 is broken, the valve 62 forming a restricted flow path between the line 60 and the low pressure side of the pump 14.

First and second latching ports 66, 68 are provided in the valve plate 26. The first latching port 66 communicates with the line 50. The second latching port 68 communicates via a line 70 with a third latching port 72 provided in the PRSOV 24. A fourth latching port 74 provided in the PRSOV 24 communicates with the low pressure side of the pump 14. The valve element 30 of the metering valve is provided with a recess 76 which, depending upon the angular position of the valve element 30, is registrable with the first and second latching ports 66, 68 to permit communication therebetween. An annular recess 78 provided in the valve element 54 of the PRSOV 24 is arranged such that when the PRSOV 24 occupies its shut-off position, and fuel flow to the engine is terminated, communication is permitted between third and fourth latching ports 72, 74, such communication being broken when the PRSOV 24 is in an open position (as shown), and there is fuel flow to the engine.

FIG. 1 illustrates the fuel system in a normal operating condition in which there is fuel flow to the engine and the recess 76 registers with the first and second latching ports 66, 68 and in which the PRSOV 24 occupies an open position, thus communication between the third and fourth latching ports 72, 74 is broken. The NLSSOV 62 occupies its 'fuel-on' operating position in which communication between the line 50 and the low pressure side of the pump 14 is broken, the valve 62 acting as a restricted flow path between the line 60 and the low pressure side of the pump 14. In this mode of operation, the angular position of the valve element 30 is controlled by the drive arrangement 32 to control the degree by which the metering orifice 28 is obscured, thereby controlling the rate at which fuel is delivered to the PRSOV 24 and to the engine burners. The PDSV 44 operates during this phase in the operation of the fuel system to maintain a substantially constant pressure drop across the metering valve 20.

In the event of an engine shut-down being initiated by either the pilot, PCMU 42 or overspeed protection unit (not shown), the NLSSOV 62 changes state from a 'fuel-on' to a 'fuel-off' position, and breaks communication between the line 60 and the low pressure side of the pump 14. Consequently, the fuel pressure within the control chamber 58 of the PRSOV 24 increases due to the connection of the line 60 to the high pressure delivery line 16 via the restrictor 64 and the filter 18, resulting in the valve element 54 thereof moving to its shut-off position, terminating the supply of fuel to the engine burners. Simultaneously, communication is established through the valve 62 between the line 50 and the low pressure side of the pump 14 resulting in the fuel pressure within the control chamber 48 of the PDSV 44 being vented to low pressure. As a consequence, the valve element 46 thereof moves to a position in which the output of the pump 14 is spilt back to the low pressure side thereof through the PDSV 44.

The movement of the PRSOV 24 to its shut-off position brings the recess 78 into registration with both the third and fourth latching ports 72, 74 bringing these ports into communication with one another. As the fourth port 74 is connected to the low pressure side of the pump 14, it will be appreciated that a consequence of the movement of the valve element 54 to its shut-off position is to connect the line 70, second latching port 68, and hence first latching port 66 to the low pressure side of the pump 14. The line 50 is thus connected to low pressure both through the latching ports and through the valve 62. The NLSSOV 62 can now be allowed to return to its 'fuel-on' operating position as illustrated in FIG. 1, with the fuel system hydraulically latched in the shut-down condition. In this condition the "by-pass" communication path between the fourth latching port 74 and first latching port 66 via the second and third latching ports 68, 72 ensures that the control chamber 48 of the PDSV 44 remains connected to the low pressure side of the pump 14. Consequently, the PDSV 44 will remain open, spilling all of the output of the pump 14 back to the inlet side thereof, thereby ensuring that the pressure drop across the PRSOV 24 is below that required to overcome the PRSOV spring 59 and so holding the PRSOV 24 and the fuel system in a configuration in which fuel is not supplied to the engine burners despite the NLSSOV 62 occupying its 'fuel-on' position. Hence the PRSOV 24 and consequently the fuel system are hydraulically latched in the shut-down condition.

Figure 2:
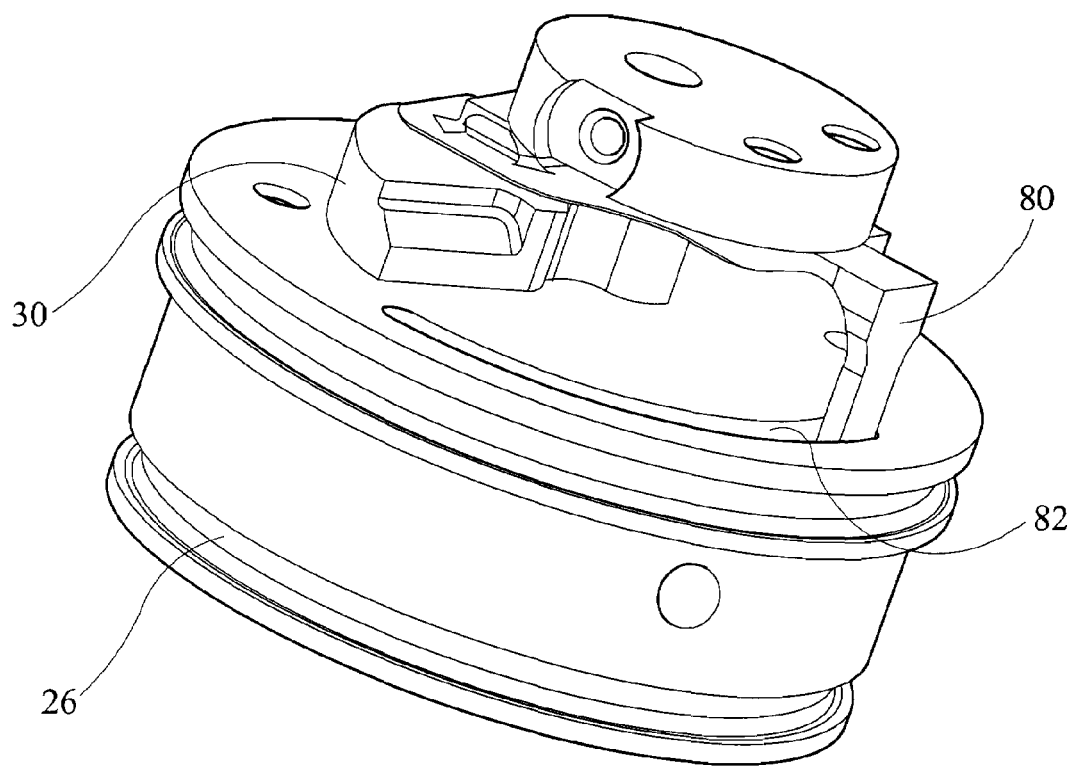
FIG. 2 is a view illustrating part of the rotary metering valve of the arrangement of FIG. 1.
Figure 3:
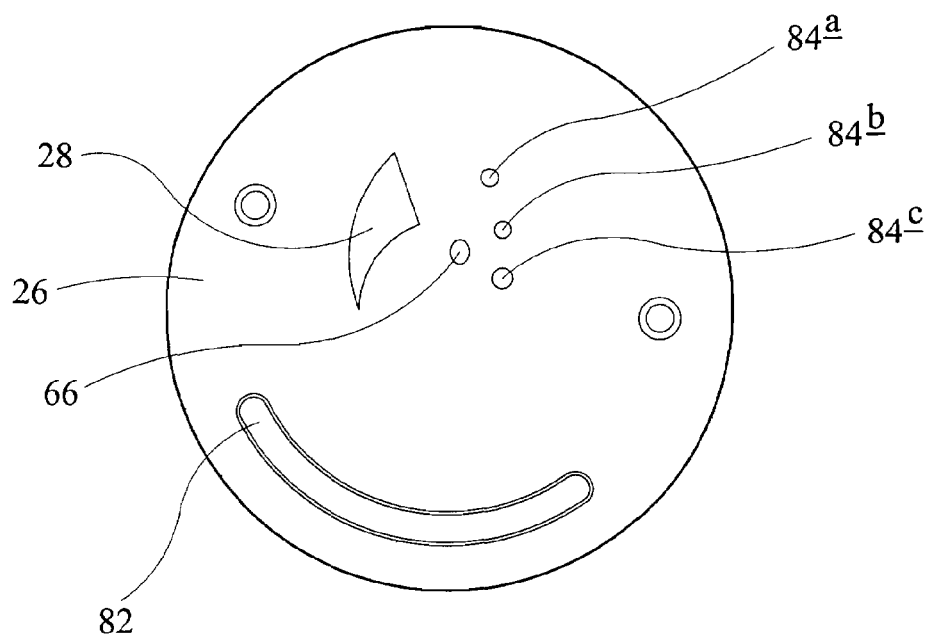
FIG. 3 is a view of the valve plate of the metering valve shown in FIG. 2.
Figure 4:
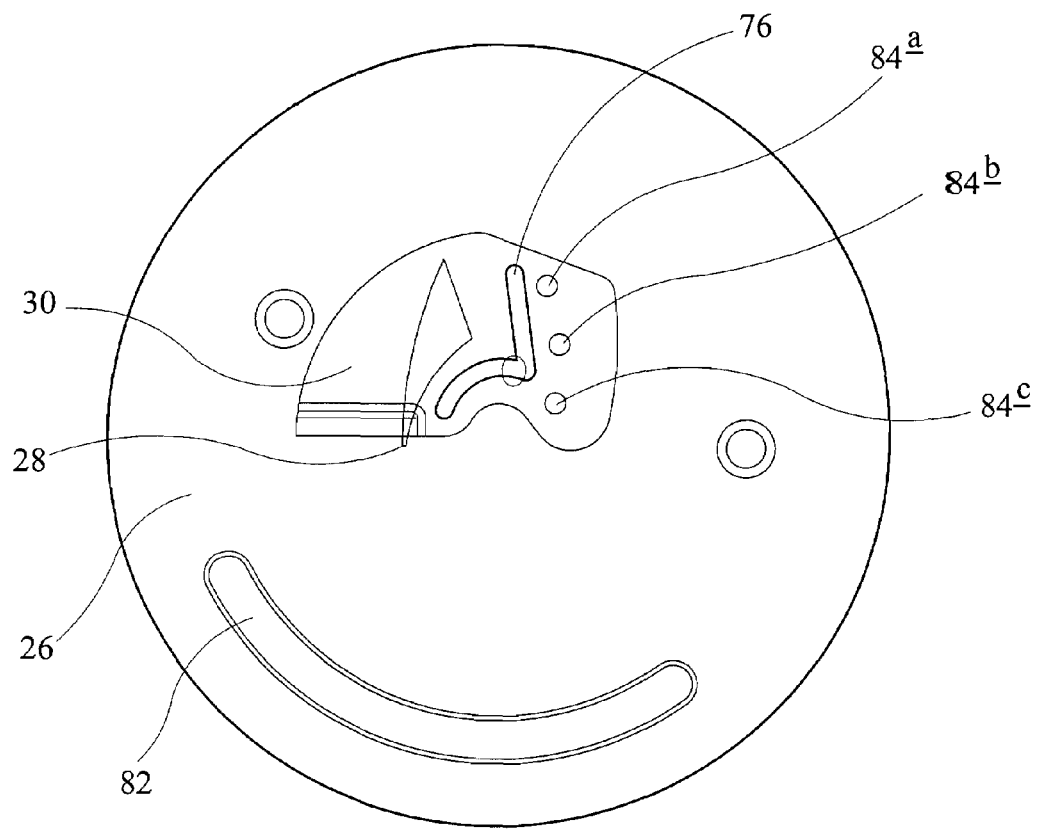
FIG. 4 illustrates operation of the metering valve of FIG. 2.

The nature of the rotary metering valve is illustrated more clearly in FIGS. 2 to 4. As illustrated, the recess 76 provided in the underside of the valve element 30 is of generally L-shaped configuration and is arranged to communicate with the first port 66 throughout its range of movement. The range of movement of the valve element 30 is limited by a hard stop member 80 forming part of the drive arrangement 32 which is able to ride within an arcuate slot 82 formed in the valve plate 26, movement of the valve 30 being limited by engagement of the member 80 with the ends of the arcuate slot 82. This engagement defines the maximum and minimum flow limits of the rotary metering valve. The second port 68 is defined by three separate openings 84a, 84b, 84c which communicate with one another within the body of the valve plate 26, which are located at different radial positions on the valve plate 26 and which are angularly positioned such that, with the valve element 30 moving in the clockwise direction as illustrated in FIG. 4, communication between the recess 76 and a second one of the openings 84b commences before communication between the recess 76 and a first one of the openings 84a is broken. Likewise, communication commences between the recess 76 and the third opening 84c before communication is broken between the recess 76 and the second opening 84b. Such an arrangement enables the ports 66, 68 to be located relatively close to the axis 30a, and minimises the surface area of the valve element 30, thus minimising the risk of the motor 34 being unable to move the valve element 30 to the desired position.

It will be appreciated from the description hereinbefore that in the event of the NLSSOV 62 operating to terminate the supply of fuel to the burner ('fuel-off' position), return movement of the NLSSOV 62 to its 'fuel-on' operating position does not result in the supply of fuel being re-established. In order to re-set the fuel system so as to permit the supply of fuel to be re-commenced, the rotary metering valve 20 must be returned to its minimum fuel delivery position. This is illustrated in FIG. 4. In this position, it will be apparent that part of the metering orifice 28 is not obscured, and so fuel is able to flow through the metering valve 20 at a relatively low rate. It will further be apparent that in this position the recess 76 is not in communication with any of the openings 84a, 84b, 84c, thus communication between the first and second latching ports 66, 68 is broken. The "by-pass" connection of the control chamber 48 to low pressure is thus broken. As fuel is able to flow through the metering valve 20, albeit at a relatively low rate, and as communication between the first and second latching ports 66, 68 is broken it will be appreciated that the supply of fuel will re-pressurise the line 50 and control chamber 48 of the PDSV 44, closing the PDSV 44. Consequently, after a short period of time, the system pressure will rise to a sufficiently high level to open the PRSOV 24, breaking the communication between the third and fourth latching ports, and that fuel can be supplied through the PRSOV 24 to the engine burners in the usual manner. Once the PRSOV 24 has opened, it is possible to move the valve element 30 and open the metering orifice 28 to a higher flow condition. This re-establishes communication between the first and second latching ports 66, 68, but does not result in a shut-down condition since the pressure in the PDSV control chamber 48 is no longer vented to LP, the path being cut-off at the PRSOV where the communication between the third and fourth latching ports is broken.

The location of the first and second latching ports 66, 68 is such that the surface area of the valve element 30 and the corresponding forces acting thereon are minimised and consequently risk of the valve element 30 tending to stick to the valve plate 26 is minimised whilst the rotational movement of the valve element 30 is unaffected. Consequently, the provision of a relatively large drive arrangement and positional feedback arrangement for the rotary metering valve 20 can be avoided, resulting in an optimised solution to the problem of incorporating hydraulic latching capability in a rotary metering valve arrangement with regards to minimising the cost and weight of the system. Furthermore, the latching porting arrangement described herein ensures that when the fuel system is in the shut-down condition the latching capability is predominantly unaffected by subsequent operation/condition of the rotary metering valve, in that the rotary metering valve must be returned to its minimum fuel delivery position before the PRSOV can be de-latched and the fuel system re-set.

Although the second latching port 68, in this embodiment, includes three outlets located at different radial and angular positions, where space allows other designs may be used to provide the required hydraulic latching capability, whilst not impacting the performance of the fuel system or incurring unacceptable cost and weight penalties.

Figure 5:
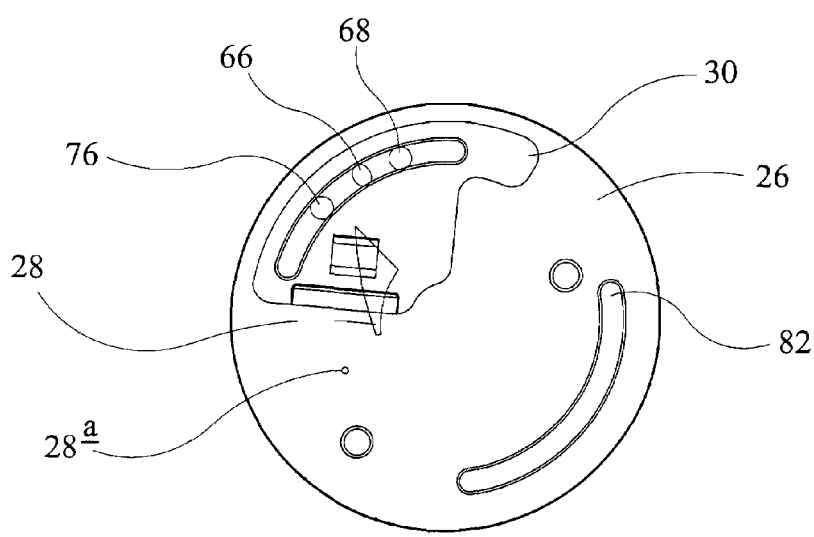
FIG. 5 is a view similar to FIG. 4 illustrating an alternative embodiment.

FIG. 5 illustrates an arrangement similar to that described hereinbefore but in which the first and second latching ports 66, 68 are located at a radial position remote from the axis 30a of angular movement of the valve element 30. In this arrangement, the recess 76 provided in the valve element 30 is of arcuate form. The location of the first and second latching ports 66, 68 in this position may, in some circumstances, be unacceptable as it results in the valve element 30 being relatively large and may increase the risk of the valve element 30 sticking to the valve plate 26, in use. However, there may be applications in which this is acceptable. A further difference between the arrangement illustrated in FIG. 5 and that of FIGS. 1 to 4 is that in the arrangement of FIG. 5, when the valve element 30 is in its minimum fuel position, the metering orifice 28 is entirely obscured by the valve element 30. In order to provide the minimum fuel flow through the metering valve 20, a minimum fuel flow aperture 28a is provided which cannot become obscured by the valve element 30. As with the arrangement described with reference to FIG. 1 to 4, when the valve element 30 is in its minimum fuel position, the recess 76 no longer registers with the second latching port 68, thus communication between the first and second latching ports 66, 68 is broken.

It will be understood that although the drawings illustrate particular forms of rotary metering valve having particular forms of metering orifice, other designs and metering orifices of other shapes could be used without departing from the scope of the invention.

It will further be appreciated that a wide range of other modifications and alterations may be made to the arrangements described hereinbefore without departing from the scope of the invention.

The invention claimed is:

1. A rotary metering valve arrangement comprising a rotary metering valve arranged to control the supply of fuel to a Pressure Raising and Shut-Off Valve (PRSOV), the metering valve having an outlet from which fuel is delivered through a delivery line to the PRSOV, the metering valve comprising a valve plate provided with first and second latching ports and an angularly movable valve element provided with a recess registrable, in use, with the first and second latching ports to control communication therebetween, the PRSOV comprising a valve member slidable within a bore provided with third and fourth latching ports, the valve member being provided with a recess registrable, in use, with the third and fourth latching ports to control communication therebetween, the second and third latching ports communicating with one another.

2. An arrangement according to claim 1, wherein the first port communicates with a control chamber of a Pressure Drop Spill Valve (PDSV).

3. An arrangement according to claim 1, wherein at least one of the first and second latching ports is located at a small radial distance from an axis of angular movement of the valve element.

4. An arrangement according to claim 3, wherein the other of the first and second latching ports is defined by a series of openings in fluid communication with one another and positioned at different angular locations, and at different distances from the axis of angular movement of the valve element.

5. An arrangement according to claim 1, further comprising stop means for restricting a range of movement of the valve element.

6. An arrangement according to claim 5, wherein the stop means is operable to prevent total closure of a metering orifice.

7. An arrangement according to claim 5, wherein the stop means comprises a stop member received within an arcuate formation provided on the valve plate.

* * * * *